May 7, 1968     H. KARTLUKE ET AL     3,381,525
METHOD FOR DETECTION OF THE IMMINENCE OR INCIDENCE
OR CAVITATION IN A LIQUID
Filed May 21, 1965

INVENTORS
Herbert Kartluke
Charles A. Boyd
BY
SEIDEL & GONDA
ATTORNEYS

United States Patent Office 3,381,525
Patented May 7, 1968

3,381,525
METHOD FOR DETECTION OF THE IMMINENCE OR INCIDENCE OR CAVITATION IN A LIQUID
Herbert Kartluke and Charles A. Boyd, West Chester, Pa., assignors to Aeroprojects Incorporated, West Chester, Pa., a corporation of Pennsylvania
Filed May 21, 1965, Ser. No. 457,614
4 Claims. (Cl. 73—67)

ABSTRACT OF THE DISCLOSURE

A liquid's proximity to cavitation is detected by inserting a vibratory probe into the liquid and varying the power required to transmit energy through the probe. A sensing element attached to the probe detects the vibratory energy therein and transduces the vibration into a signal displayed on a frequency analyzer. The detection of a subharmonic of the fundamental frequency is an indication of cavitation.

---

This invention relates to production, detection, and utilization of detection of the imminence or incidence of cavitation in a liquid, particularly for acoustical instrumentation purposes.

It has been observed that the acoustic power required to produce cavitation in a liquid decreases as the boiling condition is approached (and vice versa), whether boiling is approached through decreased ambient pressure or increased temperature or both. Theoretically, neglecting static head effects of the liquid phase above the end of the acoustic system in the liquid, the acoustic power required to produce cavitation drops to zero at boiling. However, power losses occurring in the acoustic system preclude practical achievement of this condition, so that the power requirement for cavitation is minimum (rather than zero) at the boiling state.

It has been proposed heretofore (for example, in U.S. patent application Ser. No. 283,646 entitled "Method and Apparatus Employing Vibratory Energy," filed May 27, 1963 in the name of Nicholas Maropis, now U.S. Patent No. 3,264,863) to utilize aspects of the cavitation phenomenon for ultrasonic instrumentation purposes. There, a sonic conductor driven at a resonant frequency will produce cavitation in the liquid, and the low-amplitude wide-frequency-band acoustic energy produced in the liquid incident to cavitation is transmitted to the conductor, to which are secured transducer pickup means for transducing mechanical wave energy to an electrical signal which may be amplified and delivered to an oscilloscope for viewing as a trace of frequency versus amplitude. Thus, on the oscilloscope there will appear "spikes" representing the driven-frequency vibration of the conductor and harmonics thereof, as well as low-amplitude wide-band "hash" signals (these latter appearing only if the liquid is cavitating).

It has been found that, while the invention described in the above-identified patent application, is satisfactory in many instances, a more sensitive, reliable, and useful indication of the imminence or incidence of cavitation may be obtained by means of the present invention. The present invention contemplates driving the sonic conductor so as not only to produce cavitation in the liquid, but also to produce subharmonics, as will be explained more fully hereinbelow. (The aforementioned "hash" signals may also appear, but these may be filtered out by means such as a low-band-pass filter.) For monitoring and control purposes, various types of indicating apparatus may be used in conjunction with the present invention (such as a bell, a warning light, or some other means for producing an audible or visible signal) in addition to or instead of an oscilloscope.

It is therefore the general object of the present invention to provide a new and improved method of determining the imminence or incidence of cavitation.

Other objects will appear hereinafter.

For the purpose of illustrating the invention, there is shown in the drawings forms which are presently preferred, it being understood, however, that this invention is not limited to the precise arrangements and instrumentalities shown.

Figure 1:
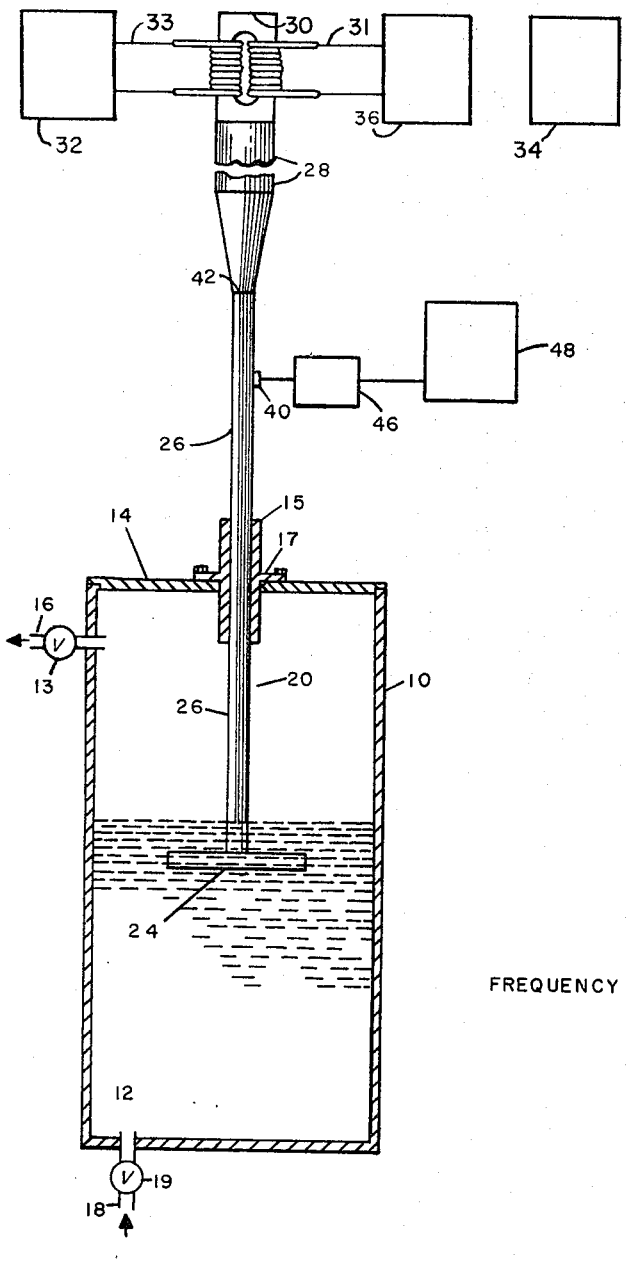
FIGURE 1 is an elevational view of an embodiment utilizing the principles of the present invention.

Referring to the drawings in detail wherein like numerals indicate like elements, there is shown in FIGURE 1 a tank 10 for containing a quantity of water 12 and/or other fluid. The tank 10 includes a cover 14, an outlet pipe 16 with valve 13, and an inlet pipe 18 with valve 19.

In order that ultrasonic cavitation may be produced in the liquid and that aspects of such cavitation may be externally indicated, an elongated sonic wave conductor (or transducer-coupling system or probe) 20 is provided, comprising elements 30, 28, 26, and 24. The probe 20 has its upper end portion extending for an appreciable distance above the tank cover 14 and therefore outside of the tank 10, while its lower portion extends through an opening in the cover 14 into the tank.

The transducer element 30 of probe 20 may be of the magnetostrictive type and of conventional construction as shown, comprising a half-wavelength-long laminated core of nickel, nickel-iron alloy, or other magnetostrictive material, properly dimensioned to insure axial resonance with the frequency of alternating current applied thereto by coil 31 so as to cause it to change in length according to its coefficient of magnetostriction. The detailed construction of a suitable magnetostrictive transducer is well known to those skilled in the art and does not form a part of the present invention and, accordingly, no description of its construction will be made herein. It will be appreciated by those skilled in the art that in place of the magnetostrictive transducer 30 shown in the drawing, other known types of transducers may be substituted; for example, electrostrictive or piezoelectric transducers made of barium titanate, quartz crystals, lead zirconate titanate, etc., may be utilized.

For powering the transducer 30, coil 31 is connected to a power suply 34 incorporating a suitable variable oscillator and amplifier; such equipment is well known to the art. The power applied to coil 31 can be measured by means such as A-C wattmeter 36.

The transducer 30 is also provided with a polarizing coil 33, the desirability of magnetically polarizing the magnetostrictive transducer 30 by means of polarizing coil 31 in order for the metal laminations in transducer 30 to efficiently convert the applied energy from excitation coil 31 into elastic vibratory energy being readi'y understood by those skilled in the art. Low voltage direct current can be supplied to coil 33 from a supply 32 such as a battery, rectifier, etc.; such sources and their use in this connection are well known.

The aforesaid power supply 34, in a typical example, is capable of producing electrical signals in the range of between about 60 cycles per second and about 300,000 cycles per second. This frequency range is suitable for purposes of the present invention, including as it does frequencies in both the audible range (such as up to about 15,000 cycles per second) and the ultrasonic range (generally above about 15,000 cycles per second). A preferred nominal design frequency for the apparatus would be in the range of from about 3,000 to about 60,000 cycles per second, with the optimum being between about 14,000 to about 50,000 cycles per second. Normally, a frequency is chosen which will provide a suitable size of apparatus for a given application or set of applications, with a frequency in the ultrasonic range having the advantage of inaudibility for reasons of operator comfort.

Thus, probe 20 may be constructed to operate in resonance at a nominal frequency of 42,000 cycles per second, for example.

As is well known to the art, for operation at the design frequency, the electrical frequency of the alternating current power supply (such as 60 cycles per second) is usually changed to match the mechanical or elastic vibratory frequency of the transducer (42,000 cycles per second in this example, as aforesaid).

The elements or acoustical coupling members 28, 26, and 24 are essentially acoustic transmission lines, and are preferably made from a low attenuation metal such as K-Monel, aluminum-bronze, beryllium-copper, etc., although special materials may be used for special purposes including corrosion-resistant materials for severe liquid environments so long as such materials will vibrate suitably.

Tapered acoustical coupling member 28 is essentially a mechanical transformer and is of contoured construction, for purposes including increasing the amplitude of vibration, such as the construction set forth at p. 163 of Piezoelectric Crystals and Ultrasonics by Warren P. Mason, published in 1950 by Van Nostrand Company. Thus, the tapered portion of member 28 may be shaped so as to have a taper that is an exponential function of its length and satisfies the following equation:

$$S = S_0 e^{-2T1}$$

where S is the reduced area at any section of the tapered portion of member 28, $S_0$ is the area of the non-tapered portion, T is a constant describing the taper, and 1 is the length of the tapered portion.

The larger (lesser amplitude) end of tapered member 28 is connected in end-to-end contact, preferably by brazing or some other type of metallurgical joint, to one end of transducer 30.

The smaller (greater amplitude) end of tapered member 28 is connected in end-to-end contact, preferably by brazing or some other type of metallurgical joint, to one end of acoustical coupling member 26.

Coupling member 26 of FIGURE 1 is of rod-like construction whose length, subject to the length limitations imposed by the present invention, may be adjustable in accordance with the depth of the tank or other vessel in which it is to be used. In accordance with the present invention, member 26 must have a minimum length of one wavelength (i.e., two one-half wavelengths) in the material of which it is made at the design frequency. However, the member 26 may have a physical length equivalent to an integral multiple of one-half wavelength in excess of two if desired, as will be explained below.

Coupling member 26 carries the plate or probe end 24, member 26 and plate 24 being fixedly joined as by brazing.

The probe 20 may if desired be made of appropriate length so that the temperature- and radiation-sensitive parts of the equipment (transducer, windings, generating equipment, and appropriate auxiliary gear) can be located conveniently outside of an extraordinary environment with only the terminal end in the environment. Suitable screw-connection of coupling member 26 to tapered member 28 also would render the terminal end of probe 20 containing plate 24 replaceable in the event of undesired erosion, corrosion, or other effects thereon, or in the event of need for a different length or material for coupler 26 or a different material or size for plate 24.

While transducer 30, tapered member 28, and coupling member 26 all vibrate in an axial or longitudinal mode of vibration (see description of longitudinal vibration of bars, at pp. 62–64 of Elements of Acoustical Engineering by Harry F. Olson, 2d edition, 1947, D. Van Nostrand Company, Inc.), plate 24 vibrates in a flexural mode of vibration (see description of transverse vibration of bars, pp. 52–56 of the same text). Coupling member 26 and plate 24 are preferably joined in an antinode-to-antinode (loop to loop) arrangement for purposes of maximum transfer of energy from member 26 to plate 24. Therefore, dimensioning of plate 24 is preferably in accordance with FIG. 3.2D (p. 52) of the aforesaid book by Olson, especially at the fundamental frequency or the second or other even-numbered overtone thereof in view of the aforesaid joining arrangement. Plate 24 preferably has a physical length corresponding to an acoustical one-half wavelength (or whole unit multiple thereof) at the fundamental resonant frequency.

In the described embodiment, designed to operate as aforesaid at a nominal fundamental resonant frequency of 42 kilocycles per second, the plate 24 may be in the form of a thin rectangular plate made of steel having dimensions of 1⅝ inches by ⅝-inch by 0.08-inch. Coupler 26 may be made, for example, of ¼-inch-diameter steel rod and have a physical length of 119.1 centimeters (which is 20 one-half wavelengths at the fundamental frequency).

Preferably, for support purposes and to minimize frequency shift of the vibratory apparatus and loss of vibratory energy to the associated supporting members, the probe 20 is supported by a force-insensitive mount 15 (see U.S. Patent No. 2,891,180 entitled, "Support for Vibratory Devices" and issued in the name of William C. Elmore). Such force-insensitive mount 15 may comprise a cylindrical steel shell having a length of one-half wavelength at the applied frequency and having a radially outwardly extending flange 17 at its one-quarter-wavelength point or midpoint. Such mount 15 may be fixedly joined, as by brazing, to coupling member 26, preferably at an antinodal or loop region of the fundamental frequency of vibration on coupling member 26, with only one end of the mount 15 being so joined and the remainder of the mount being free from attachment to coupling member 26. The flange 17 of mount 15 is fixedly joined to tank cover 14 of tank 10, in such manner as to provide a hermetic seal. It is to be noted that the joinder of the one end of the mount 15 to coupling member 26 constitutes another hermetic seal.

Probe 20 is also provided with a sensing element 40 and appropriate read-out instruments, such as electronic read-out instruments which can be attached to sensing element 40 by an electrical cable.

The sensing element 40 may be a small electromechanical transducer, such as a barium titanate wafer, attached anywhere above the liquid level along coupling member 26. Element 40 is preferably attached to a portion of member 26 which is outside of the tank 10, especially at a location where there is a large radial displacement of the vibration in the member 26. This is for purposes of providing a high voltage output from element 40 for easier read-out purposes. The sensing element 40 will produce an alternating electrical signal proportional to the alternating mechanical displacement of a particle at the point of attachment. The element 40 is acceleration-sensitive and the mechanical acceleration is 180 degrees out of phase with the displacement. This signal is displayed on the CRT of a panoramic frequency analyzer.

Assuming the member 26 to be one wavelength (two one-half wavelengths) long, and the probe end 24 and a portion of member 26 in the liquid, if the probe 20 is driven at the fundamental frequency $f_0$ (which is 42 kc. in the FIGURE 1 embodiment described herein), and if the acoustic power transmitted to the liquid is below the level required to produce cavitation, only that frequency (42 kc.) and its higher overtones or harmonics ($f_1, f_2, f_3$, etc.) will be present in the frequency spectrum of the response of the member 26 (as indicated via the sensing element 40 and the read-out instruments). How many of these overtones or harmonics can be seen depends on the amount of power applied; in the present example they would be indicated by "spikes" at 84 kc., 126 kc., etc. It can be demonstrated both theoretically and in practice that subharmonics cannot be excited in this manner.

On the other hand, if under the circumstances the amount of acoustic power is sufficient to produce cavitation in the liquid, there will be produced (in accordance with the above-identified prior art patent application) cavitation cavities covering a distribution of sizes and their collapse at different times during the acoustic pressure cycle, giving rise to the generation of broad band noise (the "hash" previously referred to, which for purposes of the present invention can be filtered out as above indicated).

In accordance with the present invention, however, when the amount of power (approximately 0.3 acoustic watt/cm.$^2$ for water at 0° C. and 1 atm. pressure) is sufficient to produce cavitation in the liquid, intermediate-amplitude spikes at frequencies which are subharmonics of the driving frequency can be detected. The production and detection of these subharmonic indications provides the increased sensitivity, reliability, and usefulness of the present invention.

In a typical example of utilization of the present invention, water at room temperature was admitted to the tank 10 through inlet pipe 18, until the surface of the water was above the level of the plate 24.

As aforesaid, the excitation coil 31 of transducer 30 had been connected to an ultrasonic power generator 34 which was so adjusted as to have a sinusoidal output of 42 kilocycles per second, the power applied to coil 33 being susceptible of measurement by A-C wattmeter 36. The polarizing coil of transducer 30 had been connected to a low-voltage D-C supply 32. The sensing element 40, located at a loop of the vibration along coupling member 26, had been connected to an electronic voltage amplifier 46, whose output had been connected to the voltage terminals of a panoramic frequency analyzer 48.

Readings were made by slowly increasing the acoustic power applied to the transducer portion 30 of the probe 20 until subharmonics appeared in the response-frequency spectrum. The subharmonic at the $f_0/2$ frequency of 21,000 c.p.s. (one-half of the driving frequency) was particularly strong and pronounced, and it occurred only when cavitation was visually and audibly observed in the water.

The number of nodes in the driving rod member 26 at the driven frequency (42 kc.) was 20, because its length was 119.1 centimeters (20 one-half wavelengths). When the acoustic power being propagated into the water was below the cavitation threshold (i.e., the level at which cavitation occurs), only the indications of the 42 kc. driving frequency and of its higher harmonics were observed. However, when the acoustic power being propagated into the water was at or above the level necessary to produce cavitation, the subharmonics in Column I below were observed and measured at the nodes (Column II). It can be seen that the observed and measured subharmonics compared very closely with frequency values of the subharmonics in Column III, which had been calculated from the following equation:

$$f = \frac{nc}{2l}$$

where
$f$ = frequency of subharmonic, c.p.s.;
$n$ = number of half-wavelengths;
$c$ = velocity of sound in member 26, cm./sec.;
$l$ = length of member 26, cm.

| I | II | III |
|---|---|---|
| Frequency Measured (sec.$^{-1}$) | n | Computed Values Frequency (sec.$^{-1}$) |
| 42,000 | 20 | 42,000 |
| 37,500 | 18 | 37,000 |
| 35,800 | 17 | 35,700 |
| 33,600 | 16 | 33,600 |
| 31,800 | 15 | 31,500 |
| 29,400 | 14 | 29,400 |
| 27,300 | 13 | 27,300 |
| 25,200 | 12 | 25,200 |
| 23,200 | 11 | 23,100 |
| 21,000 | 10 | 21,000 |
| 18,900 | 9 | 18,400 |

Figure 2:
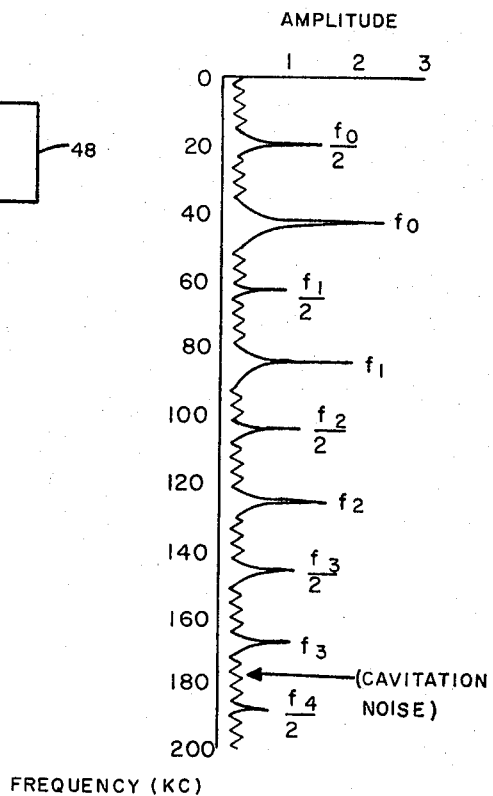
FIGURE 2 is a graphical display of cavitation noise bands in accordance with the present invention.

FIGURE 2 is a graphical display of cavitation noise bands as seen on the CRT of a panoramic frequency analyzer in accordance with the present invention, wherein the amplitudes of the various frequency indications (labeled $f_n$), including the subharmonic frequency (labeled $f_n/2$) evidences of the presence of cavitation, are representative of the results obtained.

The present invention may be used in any one of a variety of applications, including any application in which detection of the imminence or onset of cavitation provides a means, for example, of monitoring or control.

One such application has been described in copending U.S. patent application Ser. No. 223,474 entitled, "Vibratory Energy Radiating System," filed Sept. 13, 1962, in the names of James Byron Jones, Harold L. McKaig, Jr., Nicholas Maropis, and Charles A. Boyd, and now U.S. Patent No. 3,210,724, the disclosure of which is incorporated herein by reference. Thus, by means of the present invention, it is possible to maintain the maximum power level of acoustic energy being propagated into the liquid at a level below the level at which cavitation occurs, so as to insure proper propagation characteristics of the underwater sound signal. In this case, the sonar operator can adjust the transmitting power to a level which is just under the cavitation level by observing in the detection system the setting which is adjustable just below that where the spiking occurs corresponding to the excitation of the subharmonics. In this way, the power setting can be maintained at a maximum to fit the local conditions existing at the particular point where the sound is being radiated. Also in this application, the cavitation device need not be an integral part of the transmission system; that is, it might be used in a listening manner only.

While the present invention has been described in connection with a plate geometry for probe end 24, it will be appreciated that other geometries may be used, although with some sacrifice in sensitivity.

It will be appreciated by those skilled in the art that, while the present invention has been described in connection with driving the probe 20 at its design resonant frequency, it will be appreciated that a rod-plate embodiment such as the combination of members 24 and 26 may be driven at any frequency, so long as $l$ divided by $c/2f$ gives an integral number.

The present invention may be embodied in other specific forms without departing from the spirit or essential attributes thereof and, accordingly, reference should be made to the appended claims rather than to the foregoing specification as indicating the scope of the invention.

We claim:

1. A method of transmitting acoustic energy wherein an acoustic transmitter is in contact with a liquid and coupled to an acoustical energy generating means comprising the step of raising the power level of acoustical energy coupled to said transmitter from below the level at which cavitation occurs in the liquid to the level at which cavitation occurs, and detecting the appearance of subharmonic vibratory energy in the transmitter as indicative of the occurrence of cavitation.

2. A method in accordance with claim 1 wherein said maintaining step is carried out by measuring the power transmitted by said transmitter.

3. A method of determining cavitation of a liquid or the immence thereof comprising the steps of providing a sonic conductor, engaging the liquid with the conductor, applying vibratory energy through the conductor to the liquid at a particular frequency corresponding to the design frequency of the conductor, increasing the power level of applied vibratory energy until the liquid cavitates, and detecting the occurrence of cavitation by detecting the appearance of subharmonics of the particular frequency applied through the conductor.

4. The method in accordance with claim 3 including the steps of supporting the sonic conductor in a wall by a force-insensitive mount, providing a water-tight seal between said mount and said wall, providing a water-tight seal between said mount and said sonic conductor, and coupling vibratory energy to said conductor from a generator positioned on the side of said wall remote from the liquid.

References Cited

UNITED STATES PATENTS

| | | | |
|---|---|---|---|
| 3,246,516 | 4/1966 | Maropis | 73—67.1 X |
| 3,264,863 | 8/1966 | Maropis | 73—67 |

RICHARD C. QUEISSER, *Primary Examiner.*

JOHN P. BEAUCHAMP, Jr., *Examiner.*

UNITED STATES PATENT OFFICE
CERTIFICATE OF CORRECTION

Patent No. 3,381,525                                    May 7, 1968

Herbert Kartluke et al.

It is certified that error appears in the above identified patent and that said Letters Patent are hereby corrected as shown below:

In the heading to the printed specification, lines 5 and 6, "assignors to Aeroprojects Incorporated, West Chester, Pa., a corporation of Pennsylvania" should read -- assignors, by mesne assignments, to the United States of America as represented by the United States Atomic Energy Commission --.

Signed and sealed this 28th day of October 1969.

(SEAL)
Attest:

Edward M. Fletcher, Jr.                           WILLIAM E. SCHUYLER, JR.
Attesting Officer                                           Commissioner of Patents